July 12, 1949.　　　　　E. G. GUNN　　　　　2,475,833
　　　　　　　　　　　　　　FILTER

Filed Aug. 9, 1945　　　　　　　　　　　2 Sheets-Sheet 1

INVENTOR
Earl G. Gunn
BY Barlow & Barlow
ATTORNEYS

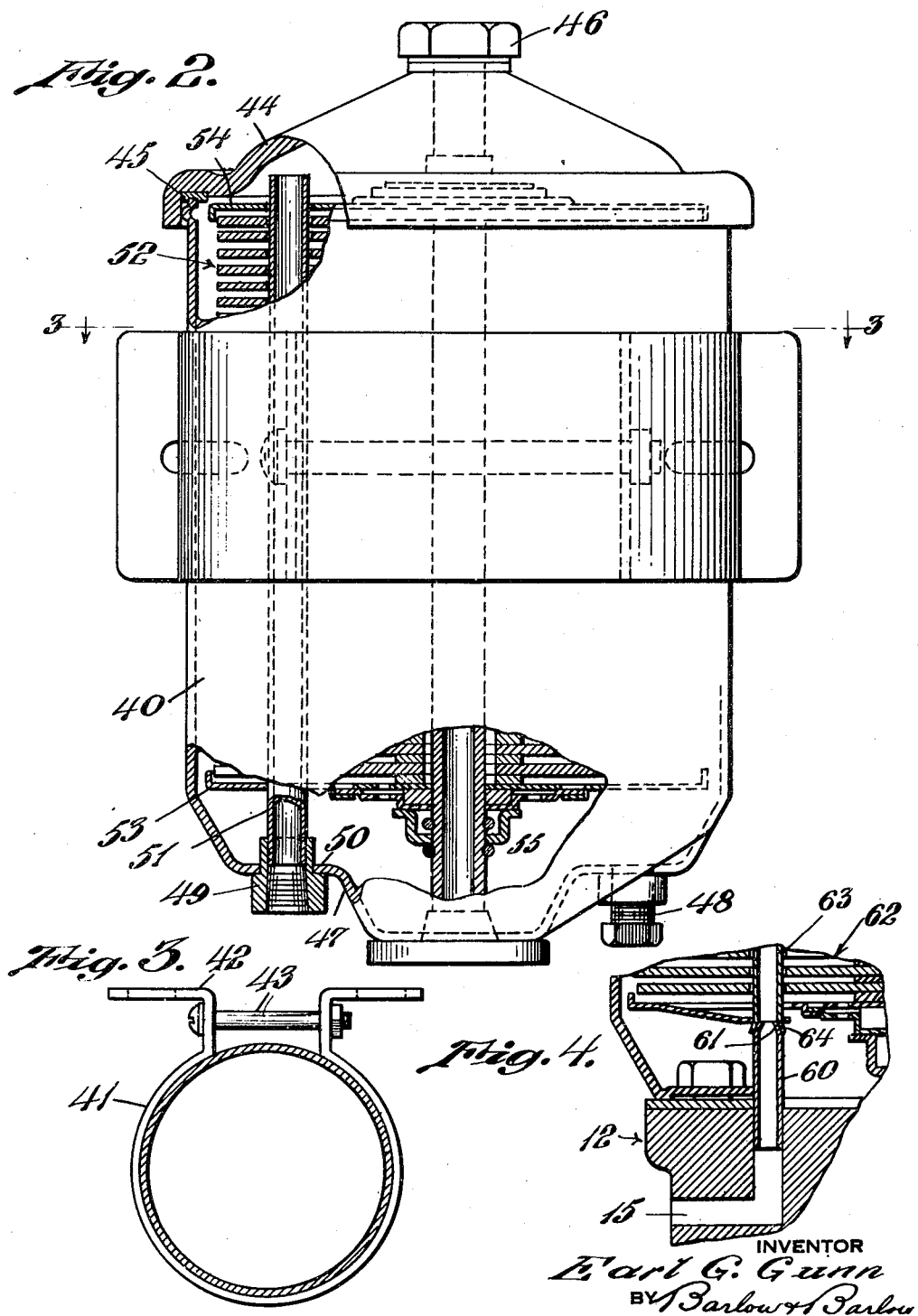

Patented July 12, 1949

2,475,833

UNITED STATES PATENT OFFICE 2,475,833

FILTER

Earl G. Gunn, Providence, R. I., assignor to Fram Corporation, a corporation of Rhode Island Application August 9, 1945, Serial No. 609,865

3 Claims. (Cl. 210—183)

This invention relates to a filter.

A filter of the type here referred to usually comprises a casing having a center discharge tube extending upwardly from the bottom wall of the casing. A cartridge or some filter element surrounds this center tube and is sealed at its upper and lower ends so that liquid to be filtered will pass inwardly from the outer surface of the cartridge to the center tube and then through some perforation in the center tube between the sealed opposite ends of the cartridge into the center tube for discharge.

Liquid to be filtered enters this casing at some point along its length so as to provide the liquid to be filtered about the outer surface of the cartridge and between the cartridge and the casing. If this liquid enters along the side of the cartridge there may be some danger of the inflowing liquid, by the turbulence which it creates, washing the contaminant which has collected in the cartridge from the cartridge. If the conduit through which this liquid enters terminates low in the casing, drainage may occur of the liquid from the casing when the flow of liquid stops. In order that the liquid to be filtered may enter at the upper part of the casing, additional construction external of the casing has been provided in filters to conduct the oil or liquid to be filtered to the upper part of the casing. This is particularly true in the base mounted type of filter.

One of the objects of this invention is to provide a conduit from the lower part of the casing to a point above the filter cartridge, which conduit will be fully contained within the casing.

Another object of this invention is to provide this conduit in a location so that it may extend well above the filter cartridge.

Another object of this invention is to provide a cartridge which will have an opening so as to receive this inlet conduit and pass therethrough at an advantageous location.

Another object of this invention is to provide a return opening into the center tube at a location so that the liquid to be filtered will pass a substantial axial distance along the cartridge between the end of the inlet conduit and the entrance to the return passage, whereby circulation of warm oil across the cartridge will be provided.

This invention is applicable both to the strap mounted and base mounted filter, although it has greater advantage in the base mounted filter as it provides a very definite saving in construction in this filter.

With these and other objects in view, the invention consists of certain novel features of construction, as will be more fully described and particularly pointed out in the appended claims.

Figure 2 is an elevation fragmentally broken away of a modified form.

Figure 3 is a section on line 3—3 of Figure 2.

Figure 4 is a sectional view of fragmental portion of a modified form of filter.

Figure 1:
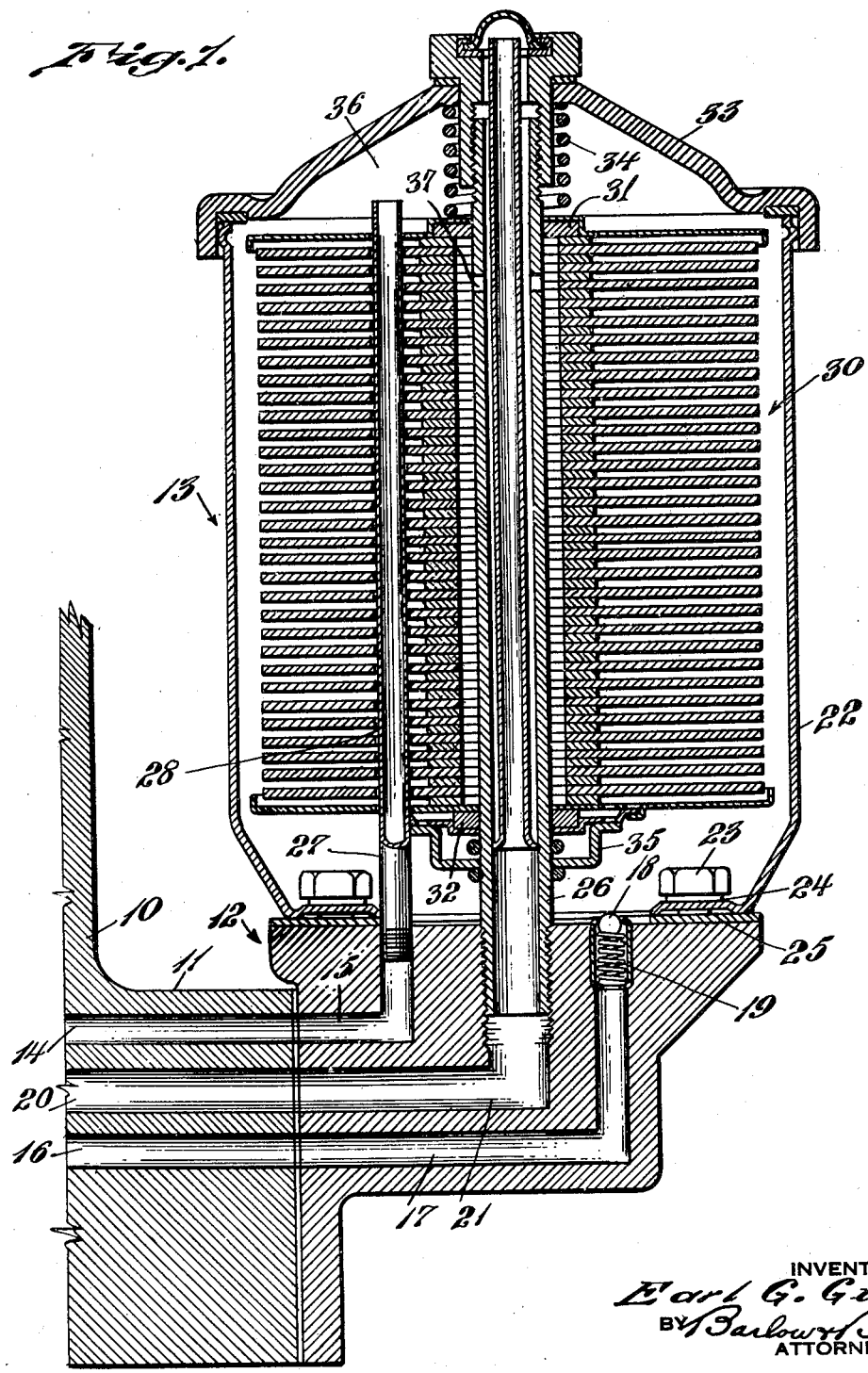
Figure 1 is a sectional view of a filter constructed in accordance with this invention.

This invention deals with the type of filter in which liquid enters and leaves the casing through the bottom wall thereof. The liquid that enters through the bottom wall is conducted to the upper part of the filter casing and then will flow either across the outer surface of the filter element to be discharged through the bottom wall of the casing in a shunt relation to the filter element or will flow because of capillary action or the difference in pressure existent in the filter case about the filter element and the discharge passage to cause the filtrate to pass through the filter element to a central conduit which is at lower pressure and thence will discharge through the bottom of the filter. Preferably, the conduit for the incoming liquid to be filtered passes upwardly through the filter element so that it may extend well above the cartridge.

With reference to the drawings, particularly Figure 1, which shows this invention in connection with a shunt flow system liquid, 10 designates the side wall of an engine block or crankcase, which has a boss 11 mounted thereon for mounting a base 12, which in turn serves to mount the filter designated generally 13. A conduit 14 is connected to the pump of a lubricating oil system for the admission of oil to be filtered through this conduit and into the conduit 15 formed in the base 12. The boss 11 is also provided with a conduit 16, which registers with conduit 17 in the base, which is controlled by a ball valve 18 pressed by spring 19 to closed position, and which is of just sufficient pressure so as to prevent oil from flowing back into the pressure rib or gallery when pressure has ceased to exist therein by reason of the stopping of the engine and the circulating pump driven thereby. A conduit 20 is also provided in the boss 11, which registers with a conduit 21 in the base for the return flow of clean oil which has been filtered.

The casing 22 of the filter is mounted upon the base by suitable bolts 23, which pass through the inturned flange 24 of the case and serve to seal the casing on the base by gasket 25. Center tube 26 stands upwardly from the base and connects with the conduits 21—20 for discharge of the filtrate lubricant.

A standpipe 27 stands upwardly from the base and is in communication with the conduits 14—15 heretofore described. The filter element 30 is of any suitable form, that here shown being of a plurality of discs of two different sizes and has a central opening for the reception of the center tube 26 and is sealed therewith at its upper end by gasket 31 and at its lower end by gasket 32. This filter element has an opening 28 for the reception of a standpipe 27 supported by base 12. The cover 33 closes the filter casing 22, and a spring 34 acts between this cover and the filter element for positioning it against the support 35 standing upwardly from the base. With the standpipe 27 extending through the filter cartridge it may be located well above the cartridge into the hollow 36 of the cover against which the entering liquid may strike to be baffled in either direction.

Lubricant to be filtered enters through the conduit 14—15 and passes upwardly through the standpipe 27 to the upper part of the casing and surrounds the filter element with the lubricant to be filtered. After lubricant enters and fills the case, pressure will build up and the ball valve 18 will be depressed and some of the lubricant will flow outwardly through the passage 17—16. The lubricant which is contained in the casing and is encircling the filter element 30 will be under certain pressure and will be in a shunt relation to the direct flow of lubricant to the pressure rib. The conduits 20—21, which connect to the crankcase sump, will be under no pressure and thus the lubricant which is to be filtered will pass through the filter element to its central opening and thence through openings 37 into this central conduit 26 and thence to the sump. Should the engine stop and the oil pump stop, the ball valve 18 will return to its seat and maintain the casing with liquid to be filtered up to the level of the opening 37, ready for a repetition of the above described operation when circulation is again established, thus preventing the casing filling with air which must be expelled before proper filtration can start. Should the lubricant become cold and somewhat thickened because of reduced temperature, as soon as pressure is reestablished flow across the filter element will occur from the top of the tube 27 to the exit opening through ball valve 18 thus warming the entire mass of oil quickly in the casing and when the temperature is such that filtering will again occur, the reestablishment of filtrate passing through the filter element will take place.

In the modified form of the invention, the casing 40 is mounted by means of strap 41 held in tight engagement with the casing by a bolt 43 and having flanges 42 to mount it upon some suitable support. The casing is of generally cylindrical form and is closed by removable cover 44, sealing with the top edge of the cylindrical wall by means of a gasket 45, with bolt 46 to hold the cover on the center tube in a manner similar to that described in connection with Figure 1. The bottom wall 47 is provided with a drain plug 48 and inlet sleeve 49 shouldered as at 50 to engage the outer surface of the bottom wall. The standpipe 51 in this form of the invention is fixed to the filter casing by means of this sleeve 49 and extends upwardly throughout the axial extent of the cylindrical casing. The filter element, designated generally 52, in this instance is provided with registering openings in the leaves or discs for the reception of the standpipe 51. The end plates 53 at the bottom and 54 at the top are also provided with openings for the reception of the standpipe. A by-pass may be provided at the lower end of the filter element, designated 55, or some by-pass connection may be connected in place of the drain plug 48.

In the modified form shown in Figure 4 a short pipe 60 extends upwardly from base 12 and terminates at its upper end in an inward taper 61. The filter element designated generally 62, has a tube 63 permanently mounted in the element as a part thereof which extends above the element as in the other two forms. This tube 63 is flared as at 64 at its lower end so as to receive the tapered or narrowed end 61 of the tube 60 and form a substantially tight joint therewith. In this modified form of the filter element this portion of the standpipe 63 is removed with the filter element and disposed of with the filter element while the replaced filter element will have, as a permanent part thereof, its portion 63 of the standpipe to engage the section 60 which is fixed to the base 12. This construction is adaptable either to the base mounted filter case 22, as shown in Figure 1 or the strap mounted case 40 as shown in Figure 2.

I claim:

1. In a filter, a casing, an entrance conduit into the casing through the bottom thereof and extending axially within the casing upwardly to a point adjacent the upper end of the casing, a discharge conduit through the bottom to the outside of the casing, a filter element in said casing, and through which the liquid to be filtered passes, a separate conduit which opens within the element to conduct the filtrate from the element through the casing, a check valve in said discharge conduit held closed during normal filtering operation but opened in response to predetermined pressure for by-passing said element, said entrance and discharge conduits being spaced axially of said element a distance to cause traverse of the liquid along said element upon development of said predetermined pressure, whereby warming of the element may occur by unfiltered liquid passing through said conduits.

2. A filter as claimed in claim 1 wherein the separate conduit has an entrance opening which is located adjacent the upper end of the casing whereby to maintain the liquid in the casing to the level of the lower of the entrance or discharge conduits.

3. A filter as claimed in claim 1 wherein the entrance conduit into the casing extends through the element.

EARL G. GUNN.

REFERENCES CITED

The following references are of record in the file of this patent:

UNITED STATES PATENTS

| Number | Name | Date |
| --- | --- | --- |
| 1,703,335 | Bower | Feb. 26, 1929 |
| 1,723,945 | McCutcheon | Aug. 6, 1929 |
| 1,780,663 | Winslow et al. | Nov. 4, 1930 |
| 1,948,479 | Caminez | Feb. 20, 1934 |
| 2,017,232 | Brown | Oct. 15, 1935 |
| 2,132,770 | Weidenbacker | Oct. 11, 1938 |
| 2,145,304 | Hill | Jan. 31, 1939 |
| 2,203,495 | Kamrath | June 4, 1940 |
| 2,253,684 | Burckhalter | Aug. 26, 1941 |
| 2,253,685 | Burckhalter | Aug. 26, 1941 |
| 2,275,481 | Wilkinson | Mar. 10, 1942 |
| 2,390,539 | Katcher | Dec. 11, 1945 |
| 2,429,321 | La Brecque | Oct. 21, 1947 |